U S009737991B2

United States Patent
Takahashi et al.

(10) Patent No.: US 9,737,991 B2
(45) Date of Patent: Aug. 22, 2017

(54) ROBOT CONTROL DEVICE CONTROLLING ROBOT BASED ON EXTERNAL FORCE APPLIED TO ROBOT AND ROBOT SYSTEM

(71) Applicant: FANUC Corporation, Yamanashi (JP)

(72) Inventors: Hiromitsu Takahashi, Yamanashi (JP); Kazuhisa Takaki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/000,714

(22) Filed: Jan. 19, 2016

(65) Prior Publication Data

US 2016/0207197 A1    Jul. 21, 2016

(30) Foreign Application Priority Data

Jan. 21, 2015 (JP) .................................. 2015-009852

(51) Int. Cl.
*B25J 9/16* (2006.01)

(52) U.S. Cl.
CPC ........... *B25J 9/1674* (2013.01); *B25J 9/1664* (2013.01); *B25J 9/1694* (2013.01); *Y10S 901/09* (2013.01)

(58) Field of Classification Search
CPC ...... B25J 9/1674; B25J 9/1664; B25J 9/1694; Y10S 901/09
USPC ........................................ 700/258, 255, 253
See application file for complete search history.

(56) References Cited

U.S. PATENT DOCUMENTS

| 5,204,598 | A | * | 4/1993 | Torii | ...................... | B25J 9/1674 |
| | | | | | | 318/563 |
| 5,304,906 | A | * | 4/1994 | Arita | .................. | G05B 19/4061 |
| | | | | | | 318/568.16 |
| 6,298,283 | B1 | * | 10/2001 | Kato | ...................... | B25J 9/1676 |
| | | | | | | 318/16 |
| 6,429,617 | B1 | * | 8/2002 | Sano | ...................... | B25J 9/1666 |
| | | | | | | 318/560 |
| 2003/0137219 | A1 | | 7/2003 | Heiligensetzer et al. | | |
| 2003/0233171 | A1 | * | 12/2003 | Heiligensetzer | ....... | B25J 9/1633 |
| | | | | | | 700/260 |
| 2008/0308533 | A1 | * | 12/2008 | Takahashi | ............ | B23K 11/253 |
| | | | | | | 219/117.1 |
| 2009/0048713 | A1 | * | 2/2009 | Glissmann | ............... | B23Q 5/58 |
| | | | | | | 700/247 |
| 2010/0145515 | A1 | * | 6/2010 | Nakanishi | .............. | B25J 9/1676 |
| | | | | | | 700/255 |
| 2011/0270443 | A1 | * | 11/2011 | Kamiya | ............... | G05B 19/401 |
| | | | | | | 700/245 |

(Continued)

FOREIGN PATENT DOCUMENTS

CN    101239467 A    8/2008
CN    102387900 A    3/2012

(Continued)

*Primary Examiner* — Stephen Holwerda
(74) *Attorney, Agent, or Firm* — Hauptman Ham, LLP (57) ABSTRACT

A robot control device includes a contact judging part which judges if the robot has contacted an object based on external force which is detected by the sensor, a stop command part which makes the robot stop when it is judged that the robot has contacted the object, a continuous contact judging part which judges if the robot continues to contact the object after making the robot stop, and a retraction command part which makes the robot retract in a direction away from the object when it is judged that the robot continues to contact the object.

9 Claims, 5 Drawing Sheets

(56) References Cited

U.S. PATENT DOCUMENTS

2012/0245733 A1* 9/2012 Bjorn .................... B25J 9/1676
  700/253
2014/0379128 A1* 12/2014 Ishikawa ................ B25J 9/1674
  700/250

FOREIGN PATENT DOCUMENTS

| CN | 102649169 A | 8/2012 |
| JP | 62-38780 A | 2/1987 |
| JP | 2000-052286 A | 2/2000 |
| JP | 2001-117618 A | 4/2001 |
| JP | 2003-25272 A | 1/2003 |
| JP | 2008-142829 A | 6/2008 |
| JP | 2014-018901 A | 2/2014 |

* cited by examiner

ROBOT CONTROL DEVICE CONTROLLING ROBOT BASED ON EXTERNAL FORCE APPLIED TO ROBOT AND ROBOT SYSTEM

RELATED APPLICATIONS

The present application claims priority to Japanese Application Number 2015-009852, filed Jan. 21, 2015, the disclosure of which is hereby incorporated by reference herein in its entirety.

BACKGROUND OF THE INVENTION

1. Field of the Invention

The invention relates to a robot control device which controls a robot based on the external force which is applied to the robot and to a robot system.

2. Description of the Related Art

Known in the art is a robot control device which makes a robot perform a retraction operation when detecting that the robot contacts an object during robot work (for example, Japanese Patent Publication No. 2000-052286A, Japanese Patent Publication No. 2001-117618A, and Japanese Patent Publication No. 2014-018901A).

When an object contacts a robot for an instant and the contact between the robot and object is immediately ended, sometimes the work may be continued without the robot retracting. However, in the above-mentioned prior art, when the robot control device detects that the robot has contacted an object, the robot immediately performs a retraction operation. Therefore, sometimes a robot ends up performing an unnecessary retraction operation.

SUMMARY OF THE INVENTION

In an aspect of the invention, a robot control device, which controls the operation of a robot based on an output from a sensor which detects an external force applied to the robot, comprises a contact judging part which judges whether the robot has contacted an object based on the external force detected by the sensor; and a stop command part which stops the robot when the contact judging part judges that the robot has contacted the object.

Further, the robot control device comprises a continuous contact judging part which judges whether the robot continues to contact the object after stopping the robot; and a retraction command part which makes the robot retract in a direction away from the object when the continuous contact judging part judges that the robot continues to contact the object.

The contact judging part may judge that the robot has contacted the object when the external force equal to or larger than a predetermined threshold value is detected. The continuous contact judging part may judge that the robot continues to contact the object when the external force over a predetermined threshold value is detected when a predetermined time has elapsed from a time point when the stop command part stops the robot.

The robot control device may further comprise an integrated value calculating part which calculates an integrated value of the external forces from a time point when the stop command part stops the robot. The continuous contact judging part may judge that the robot continues to contact the object when the integrated value exceeds a predetermined threshold value until a predetermined time has elapsed from the time point.

In another aspect of the invention, the robot system comprises a robot and the above-mentioned robot control device which controls the robot.

DESCRIPTION OF PREFERRED EMBODIMENTS

Below, embodiments of the invention will be explained in detail based on the drawings. First, referring to FIG. 1 and FIG. 2, a robot system 10 according to an embodiment of the invention will be explained. The robot system 10 includes a robot 12 and a robot control device 50 which controls the robot 12.

Figure 1:
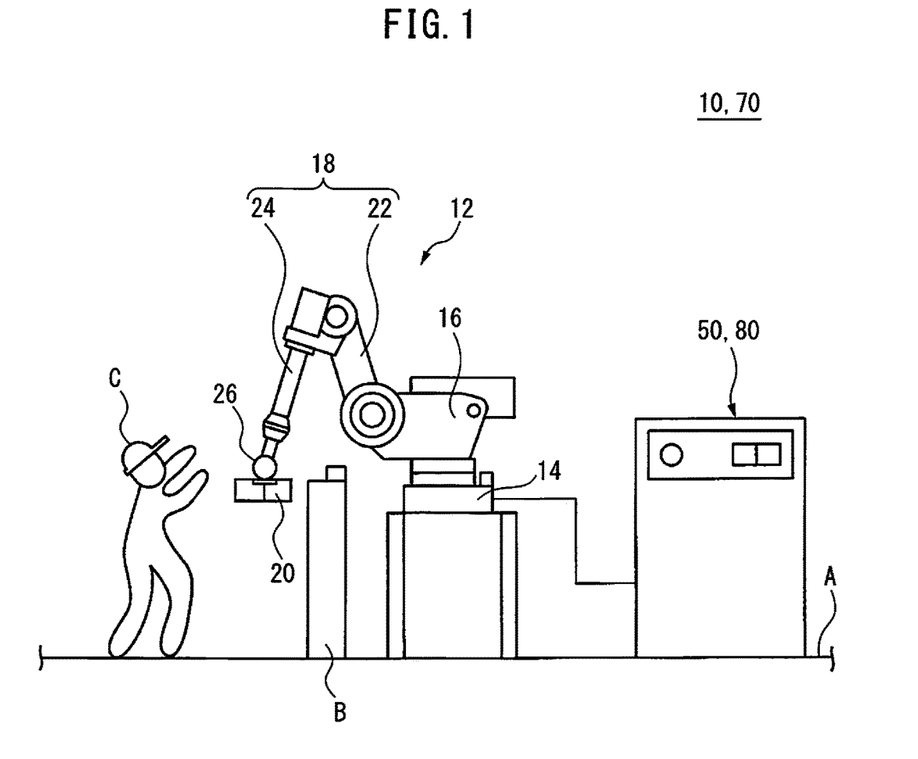
FIG. 1 is a view of a robot system according to an embodiment of the invention.

The robot 12 is e.g. a vertical multi-articulated robot, and includes a robot base 14, swivel drum 16, robot arm 18, and robot hand 20. The robot base 14 is fixed on the floor A of a work cell. The swivel drum 16 is attached to the robot base 14 so as to be able to swivel about the vertical axis.

The robot arm 18 includes a lower arm 22 rotatably attached to the swivel drum 16, and a forearm 24 rotatably attached to the distal end of the lower arm 22. The robot hand 20 is attached to the distal end of the forearm 24 via a wrist 26. The robot hand 20 can perform various types of work such as gripping and releasing a workpiece (not shown).

Figure 2:
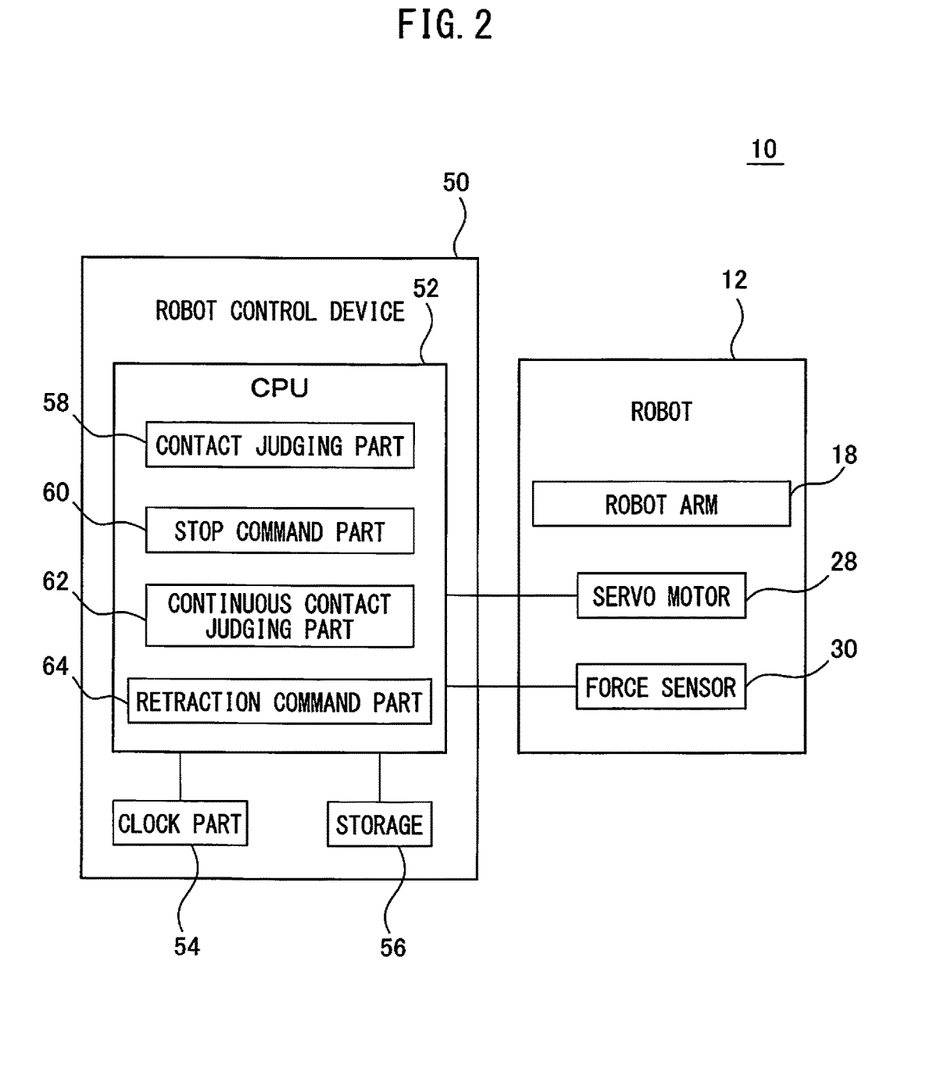
FIG. 2 is a block diagram of the robot system shown in FIG. 1.

As shown in FIG. 2, the robot 12 includes servo motors 28 and a force sensor 30. The servo motors 28 are respectively built in the swivel drum 16, robot arm 18, and wrist 26, and drive these components to rotate about the rotational axes in accordance with a command from the robot control device 50.

The force sensor 30 is built in the swivel drum 16, robot arm 18, or wrist 26, and can detect the external force applied to the robot 12. As an example, the force sensor 30 includes a strain gauge which measures the strain value of a component at a position where the force sensor 30 is mounted.

The robot control device 50 includes a CPU (central processing unit) 52, clock part 54, and storage 56. The clock part 54 and storage 56 are connected to the CPU 52 via a bus. The clock part 54 clocks an elapsed time from a predetermined time point, in accordance with a command from the CPU 52. The CPU 52 records the elapsed time measured by the clock part 54 in the storage 56.

The storage 56 is comprised of an electrically erasable programmable nonvolatile memory such as an EEPROM®, or random access memory such as DRAM, SRAM capable of being read out and written on at a high speed.

In this embodiment, the CPU 52 has functions of a contact judging part 58, stop command part 60, continuous contact judging part 62, and retraction command part 64. Note that, the functions of the contact judging part 58, stop command part 60, continuous contact judging part 62, and retraction command part 64 will be explained later.

Next, referring to FIG. 1 to FIG. 3, the operation of the robot system 10 will be explained. The robot control device 50 sends commands to the servo motors 28 built in the robot 12 so as to operate the robot 12. During operation of the robot 12, the robot 12 may contact an object outside of the robot 12 such as a part B (FIG. 1) or a worker C (FIG. 1).

Figure 3:
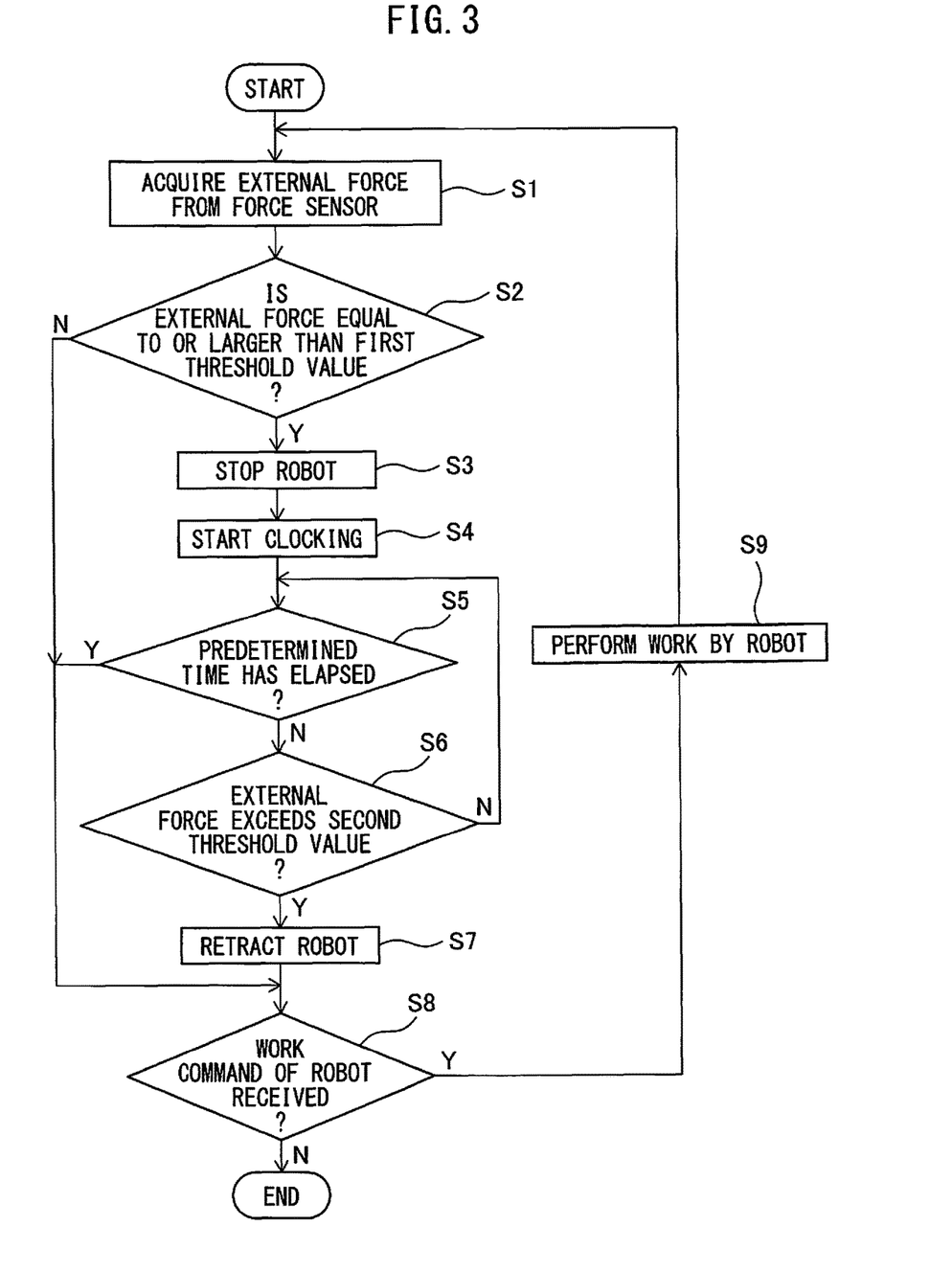
FIG. 3 is a flow chart which shows an example of a method of controlling the robot.

FIG. 3 is a flow chart which shows an example of a control method of a robot 12 in the case where the robot 12 contacts the object during operation of the robot 12. At step S1, the CPU 52 acquires information of the external force applied to the robot 12 from the force sensor 30 at a predetermined period T.

As an example, when the force sensor 30 includes a strain gauge, the CPU 52 acquires a strain value from the force sensor 30 at the predetermined period T, and calculates the external force applied to the robot 12 based on the strain value. The CPU 52 records the acquired external forces in the storage 56.

At step S2, the CPU 52 judges whether the most recent external force acquired at step S1 becomes equal to or larger than a predetermined first threshold value. The first threshold value is pre-recorded in the storage 56.

The CPU 52 reads out from the storage 56 the first threshold value and the most recent one of the external forces periodically recorded at step S1, and compares them. When judging that the external force is equal to or larger than the first threshold value (i.e., judging "YES"), the CPU 52 proceeds to step S3. On the other hand, when judging that the external force is smaller than the first threshold value (i.e., judging "NO"), the CPU 52 proceeds to step S8.

Thus, the CPU 52 compares the external force detected by the force sensor 30 with the first threshold value, and judges that the robot 12 has contacted the object (e.g., the part B or worker C) when the external force is equal to or larger than the first threshold value. Therefore, the CPU 52 functions as the contact judging part 58 (FIG. 2) which judges whether the robot 12 has contacted the object based on the external force detected by the force sensor 30.

At step S3, the CPU 52 sends commands to the servo motors 28 so as to stop the operation of the robot 12. Thus, in this embodiment, the CPU 52 functions as the stop command part (FIG. 2) which stops the robot 12 when the contact judging part 58 judges that the robot 12 has contacted the object.

At step S4, the CPU 52 sends a command to the clock part 54 so as to start clocking the elapsed time. As an example, the time point $t_S$ at which the clocking is started at step S4 is set to the time point $t_1$ at which the robot 12 is stopped at step S3. As another example, the clock part 54 may clock a standard time (e.g., Japan standard time), and the CPU 52 may record the standard time at the time point $t_S$ in the storage 56.

At step S5, the CPU 52 judges whether the elapsed time clocked at step S4 reaches a predetermined time $t_3$ (e.g., 5 seconds). The time $t_3$ is pre-recorded in the storage 56.

Note that, if the clock part 54 counts the above-mentioned standard time, the CPU 52 judges whether the predetermined time $t_3$ has elapsed from the standard time at the time point $t_S$ recorded at step S4.

When judging that the predetermined time $t_3$ has not elapsed (i.e., judging "NO"), the CPU 52 proceeds to step S6. On the other hand, when judging that the predetermined time $t_3$ has elapsed (i.e., judging "YES"), the CPU 52 proceeds to step S8.

At step S6, the CPU 52 judges whether the most recent one of the external forces periodically obtained at step S1 has exceeded a predetermined second threshold value. The second threshold value is pre-recorded in the storage 56.

The CPU 52 reads out from the storage 56 the second threshold value and the most recent one of the external forces periodically recorded at step S1, and compares them. When judging that the external force has exceeded the second threshold value (i.e., judging "YES"), the CPU 52 proceeds to step S7. On the other hand, when judging that the external force has not exceeded the second threshold value (i.e., judging "NO"), the CPU 52 returns to step S5.

Thus, in this embodiment, the CPU 52 judges that the robot 12 continues to contact the object (e.g., the part B or worker C) after the robot 12 stops, when the external force over the second threshold value is detected until the time $t_3$ has elapsed from the time point $t_1$. Therefore, the CPU 52 functions as the continuous contact judging part 62 (FIG. 2) which judges whether the robot 12 continues to contact the object.

At step S7, the CPU 52 sends commands to the servo motors 28 so as to make the robot 12 retract from the object. As an example, if the robot arm 18 contacts the object, the CPU 52 calculates the direction $D_1$ in which the object abuts against the robot arm 18, based on the information of the external force (e.g., the strain value) from the force sensor 30 built in the robot arm 18.

Then, the CPU 52 sends a command to the servo motor 28 built in the robot arm 18 so as to move the robot arm 18 in the direction $D_1$. Thus, the CPU 52 makes the robot arm 18 retract from the object so as to move away from the object.

Further, as another example, the CPU 52 successively records positional commands of the robot arm 18 in the storage 56. When the robot arm 18 contacts the object, the CPU 52 sequentially reads out the positional command values retroactively in time from the one which was recorded most recently from the time point when judging "YES" at step S2.

Then, the CPU 52 sequentially moves the robot arm 18 to positions corresponding to the sequentially read out positional commands. Thus, the CPU 52 can make the robot arm 18 retract from the object so as to backtrack along the path before colliding with the object.

At step S8, the CPU 52 judges whether a work command of the robot 12 has been received from the user or a host controller. When judging that the work command of the robot 12 has been received (i.e., judging "YES"), the CPU 52 proceeds to step S9. On the other hand, when judging that the work command of the robot 12 has not been received (i.e., judging "NO"), the CPU 52 ends the flow shown in FIG. 3.

At step S9, the CPU 52 sends commands to the servo motors 28 so as to perform work, such as gripping a workpiece by the robot hand 20 and transporting it. Then, the CPU 52 loops the steps S1-S9 until judging "NO" at step S8.

As explained above, in this embodiment, the CPU 52 executes the operation for retracting the robot 12, only when judging that the robot 12 continues to contact the object (e.g., the part B or worker C) after stopping the robot 12.

According to this configuration, it is possible to prevent the robot 12 from retracting when an object momentarily contacts the robot 12. Therefore, the unnecessary retraction operation of the robot 12 can be eliminated, so it is possible to improve the work efficiency of the robot 12.

Further, according to this embodiment, the following advantage can be obtained when applied to a human cooperation type robot, the need for which has been rising in recent years. This advantage will be explained referring to FIG. 1.

When the worker C and the robot 12 cooperate in work, it may be necessary that the worker C stops the robot 12 at a desired position during operation, then the worker C performs a work on the workpiece, and after the worker C finishes the work, the robot 12 executes an operation such as transporting the workpiece.

In this case, the worker C hits the robot 12 (e.g., robot arm 18 or robot hand 20) during operation by his or her hand, so as to apply a momentary external force to the robot 12, in this embodiment. Then, the CPU 52 judges that the external force equal to or larger than the first threshold value has been applied to the robot 12 at the above-mentioned step S2, and stops the robot 12 at step S3.

Since the external force applied to the robot 12 from the worker C is momentary (i.e., an impulse), the external force is not detected after stopping the robot 12. Therefore, the robot retraction operation of step S7 is not executed.

Due to this, the worker C can stop the robot 12 at a desired position only by hitting it. Accordingly, the worker C can smoothly perform cooperation work together with the robot 12.

Figure 4:
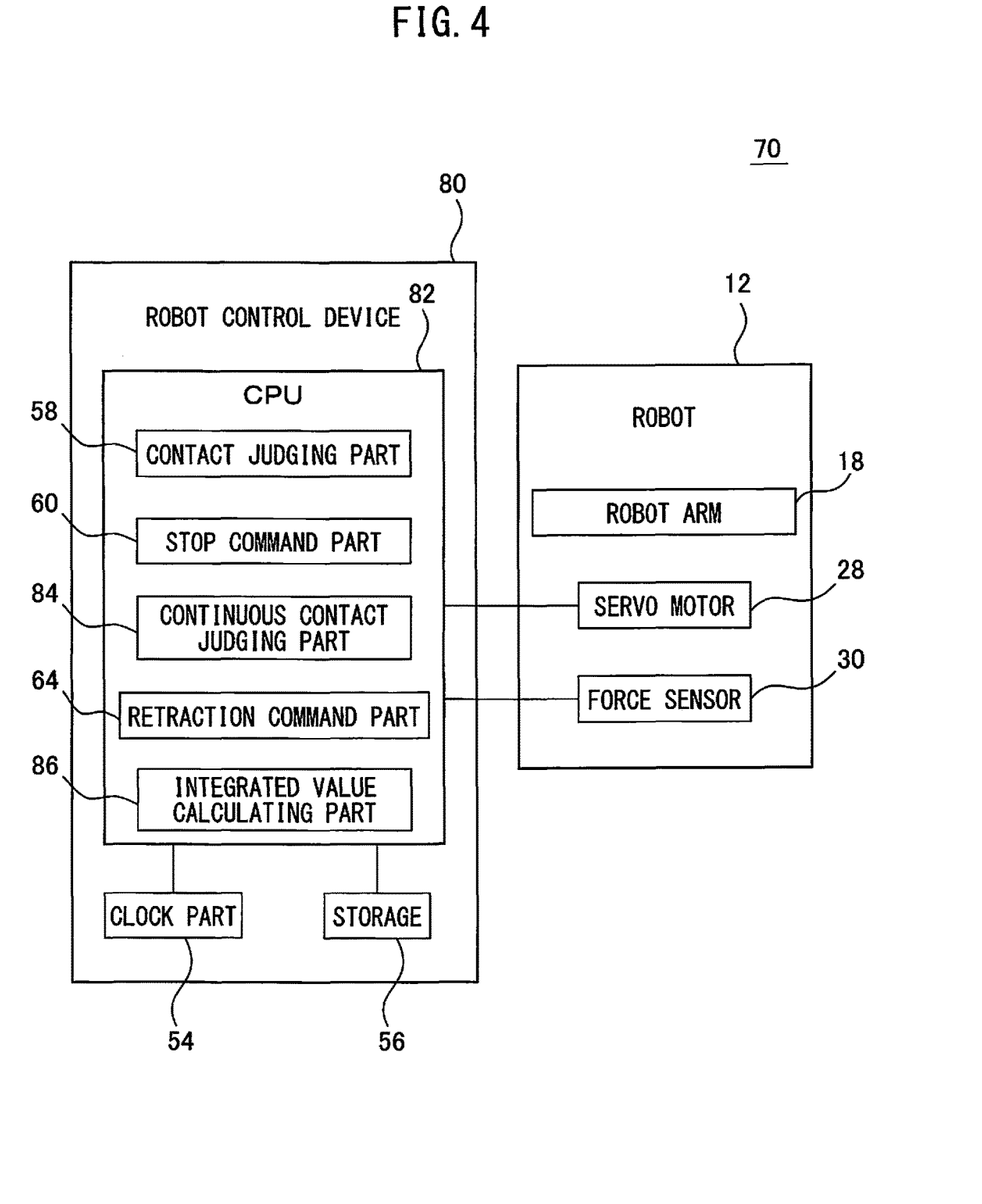
FIG. 4 is a block diagram of a robot system according to another embodiment of the invention.

Next, referring to FIG. 1 and FIG. 4, a robot system 70 according to another embodiment of the invention will be explained. Note that, in this embodiment, elements similar to the above-mentioned embodiment will be assigned the same reference numerals, and detailed explanations thereof will be omitted.

The robot system 70 includes the robot 12 and a robot control device 80 which controls the robot 12. The robot control device 80 includes a CPU 82, the clock part 54, and the storage 56.

The CPU 82 has functions of the contact judging part 58, the stop command part 60, a continuous contact judging part 84, the retraction command part 64, and an integrated value calculating part 86. Note that, the functions of the continuous contact judging part 84 and integrated value calculating part 86 will be explained later.

Next, referring to FIG. 1, FIG. 4, and FIG. 5, the control method of the robot 12 by the robot control device 80 in the case where the robot 12 contacts an object during its operation will be explained.

Figure 5:
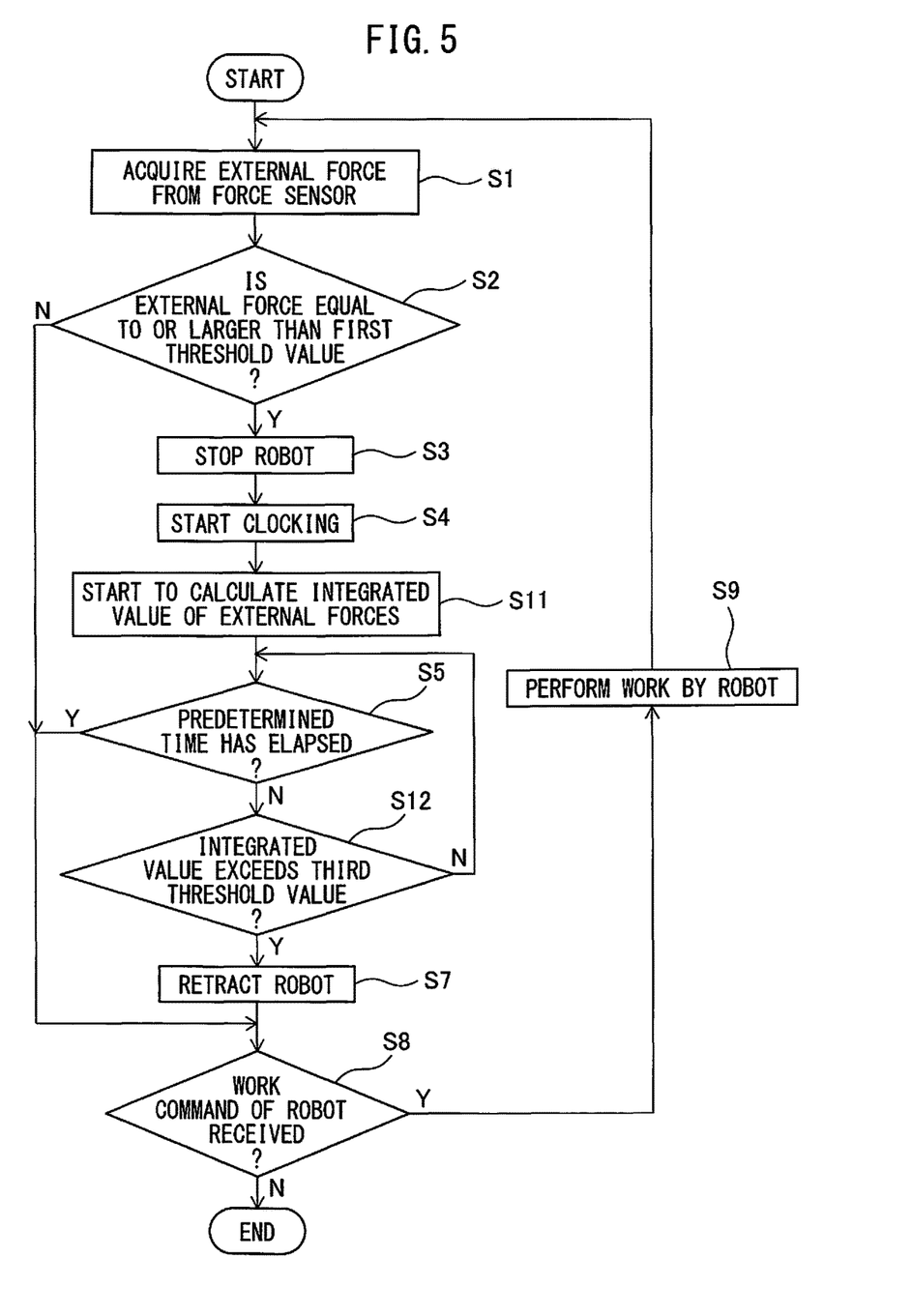
FIG. 5 is a flow chart which shows another example of a method of controlling the robot.

Note that, in the flow shown in FIG. 5, steps similar to the above-mentioned flow shown in FIG. 3 are assigned the same reference numerals, and detailed explanations thereof will be omitted. At step S11, the CPU 82 starts to calculate the integrated value of the external forces which are periodically acquired at step S1.

Specifically, the CPU 82 integrates the external forces obtained from the force sensor 30 at the period T from the time point $t_1$ when stopping the robot 12 at step S3, and records the calculated integrated value of the external forces in the storage 56. For example, if the external force obtained from the force sensor 30 at the n-th cycle (i.e., nT) after the start of step S11 is $f_n$, the integrated value $\Sigma f$ of the external forces is calculated in accordance with the following formula:

$$\Sigma f = \sum_{i=1}^{n} fi$$

Thus, in this embodiment, the CPU 82 calculates the integrated value $\Sigma f$ of the external forces obtained from the force sensor 30, from the time point $t_1$ when stopping the robot 12 at step S3. Therefore, CPU 82 functions as the integrated value calculating part 86 (FIG. 4) which calculates the integrated value $\Sigma f$ of the external forces from the time point $t_1$.

At step S12, the CPU 82 judges whether the integrated value calculated at step S11 has exceeded a predetermined third threshold value. The third threshold value is pre-recorded in the storage 56.

The CPU 82 reads out from the storage 56 the third threshold value and the most recently recorded integrated value $\Sigma f$, and compares them. When judging that the integrated value $\Sigma f$ has exceeded the third threshold value (i.e., judging "YES"), the CPU 82 proceeds to step S7. On the other hand, when judging that the integrated value $\Sigma f$ has not exceeded the third threshold value (i.e., judging "NO"), the CPU 82 returns to step S5.

Thus, in this embodiment, the CPU 82 judges that the robot 12 continues to contact the object (e.g., the part B or worker C) after stopping the robot 12, when the integrated value $\Sigma f$ exceeds the third threshold value until the time $t_3$ has elapsed from the time point $t_1$. Therefore, the CPU 82 functions as the continuous contact judging part 84 (FIG. 4) which judges whether the robot 12 continues to contact the object.

According to this embodiment, the CPU 82 executes the operation for retracting the robot 12 only when judging that the robot 12 continues to contact the object (e.g., the part B or worker C) after stopping the robot 12. According to this configuration, unnecessary retraction operation of the robot 12 can be eliminated, so the work efficiency of the robot 12 can be improved.

Further, according to this embodiment, the worker C can stop the robot 12 at a desired position just by hitting the robot 12. Therefore, the worker C can smoothly perform the cooperation work together with the robot 12.

Note that, at step S11 in FIG. 5, the CPU 82 may have a function of an average value calculating part which calculates an average value of the external forces, instead of the above-mentioned integrated value $\Sigma f$. Specifically, the CPU 82 can calculate the average value $f_{AVE}$ of the external forces in accordance with the following formula:

$$f_{AVE} = \frac{1}{n}\sum_{i=1}^{n} fi$$

Alternatively, at step S11 in FIG. 5, the CPU 82 may have a function of a standard deviation calculating part which calculates a standard deviation of the external forces, instead of the above-mentioned integrated value $\Sigma f$. Specifically, the CPU 82 can calculate the standard deviation $f_{SD}$ of the external forces in accordance with the following formula:

$$f_{SD} = \sqrt{\frac{1}{n}\sum_{i=1}^{n}(fi - f_{AVE})^2}$$

In this case, the storage 56 pre-records a threshold value corresponding to $f_{AVE}$ or $f_{SD}$. Further, at step S12, CPU 82 compares the most recently calculated $f_{AVE}$ or $f_{SD}$ with the corresponding threshold value. Then, CPU 82 may judge that the robot 12 continues to contact the object (e.g., the part B or worker C) after stopping the robot 12, when judging that the $f_{AVE}$ or $f_{SD}$ has exceeded the corresponding threshold value.

Note that, in the above-mentioned embodiments, the clock part 54 and the storage 56 are incorporated in the robot control device 50, 80. However, the clock part 54 or storage 56 may be provided as an external device of the robot control device 50, 80.

For example, a storage as an eternal device may be connected to the robot control device via network, and the robot control device may send obtained data such as the external force or integrated value via the network so as to record it in the storage.

Further, in the above-mentioned embodiments, the force sensor 30 includes a strain gauge. However, the force sensor 30 may include a laser displacement meter, proximity sensor, opt-sensor, electrostatic capacity type-displacement meter, etc. The CPU 52, 82 can calculate the magnitude and direction of the external force applied to the robot 12 based on the output from these sensors.

Above, embodiments of the invention were used to explain the invention, but the above embodiments do not limit the inventions according to the claims. Further, combinations of the features which are explained in the embodiments of the invention may also be included in the technical scope of the invention. However, not all of the combinations of these features are necessarily essential for the solution of the invention. Further, the fact that the above embodiments can be changed or improved in various ways would be clear to a person skilled in the art.

Further, it should be noted that the operations, routines, steps, stages, and other processing in the device and system in the claims, specification, and drawings, unless particularly clearly indicated by "before", "in advance of", etc. or the output of prior processing being used for later processing, can be realized in any order. In the flow of operations in the claims, specification, and drawings, even if explained using "first", "next", "then", etc. for convenience, this does not mean the execution in this order is essential.

The invention claimed is:

1. A robot control device which controls an operation of a robot based on an output from a sensor which detects an external force applied to the robot, the robot control device comprising:
   a processor configured to
      judge whether the robot has contacted an object based on the external force detected by the sensor;
      stop the robot when the processor judges that the robot has contacted the object;
      judge whether the robot continues to contact the object after stopping the robot; and
      retract the robot in a direction away from the object when the processor judges that the robot continues to contact the object after said stopping the robot.

2. The robot control device according to claim 1, wherein the processor is configured to judge that the robot has contacted the object when the external force detected by the sensor is equal to or larger than a predetermined threshold value.

3. The robot control device according to claim 1, wherein the processor is configured to judge that, after said stopping the robot, the robot continues to contact the object when the external force over a predetermined threshold value is detected by the sensor until a predetermined time has elapsed from a time point when the robot stops.

4. The robot control device according to claim 1,
   wherein the processor is further configured to calculate an integrated value of the external force from a time point when the robot stops, and
   wherein the processor is configured to judge that, after said stopping the robot, the robot continues to contact the object when the integrated value exceeds a predetermined threshold value until a predetermined time has elapsed from the time point.

5. A robot system, comprising:
   a robot; and
   the robot control device according to claim 1 which controls the robot.

6. The robot system according to claim 5, wherein the sensor is a force sensor built in a swivel drum, robot arm or wrist of the robot.

7. The robot system according to claim 6, wherein the processor is configured to acquire information of the external force applied to the robot from the force sensor at a predetermined period.

8. The robot control device according to claim 3, further comprising:
   a storage configured to store
      the external force applied to the robot, and
      the predetermined threshold value; and
   a clock configured to clock the predetermined time.

9. The robot control device according to claim 8, wherein the storage and the clock are built in an external device.

* * * * *